(12) United States Patent
Kondo (10) Patent No.: US 7,193,389 B2
(45) Date of Patent: Mar. 20, 2007

(54) ELECTRONIC APPARATUS

(75) Inventor: Hakudai Kondo, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 11/102,800

(22) Filed: Apr. 11, 2005

(65) Prior Publication Data

US 2005/0258803 A1   Nov. 24, 2005

(30) Foreign Application Priority Data

May 21, 2004   (JP)   .............................. 2004-151288

(51) Int. Cl.
*H02J 7/00*      (2006.01)
*H01R 27/00*     (2006.01)
*H01R 3/00*      (2006.01)
*H01M 2/00*      (2006.01)

(52) U.S. Cl. ...................... 320/107; 439/218; 439/500; 429/1; 320/116

(58) Field of Classification Search ................ 320/107, 320/116; 439/218, 500; 429/1
See application file for complete search history.

(56) References Cited

U.S. PATENT DOCUMENTS 4,913,981 A * 4/1990 Hynes et al. .................. 429/1
5,797,969 A * 8/1998 Olson et al. .................... 607/5
6,509,717 B2 * 1/2003 Lee ............................. 320/116
6,866,527 B2 * 3/2005 Potega ........................ 439/218

FOREIGN PATENT DOCUMENTS

| JP | 10223187 | * | 8/1998 |
| JP | 11089102 | * | 3/1999 |
| JP | A 11-89102 | | 3/1999 |
| JP | A 2001-244013 | | 9/2001 |
| JP | 2002270142 | * | 9/2002 |
| JP | 2003068256 | * | 3/2003 |
| JP | 2003109706 | * | 4/2003 |

* cited by examiner

*Primary Examiner*—Pia Tibbits
(74) *Attorney, Agent, or Firm*—Oliff & Berridge, PLC (57) ABSTRACT

An electronic apparatus includes a housing part in which a battery is housed and a body-side connector for connecting the battery housed in the housing part to an apparatus body. When a battery-side connector connected to the battery through a connecting cable is connected to the body-side connector, the battery is connected to the apparatus body. A label is affixed on the body near the body-side connector. Provided on the label is a connector-connection indication which indicates an orientation of the battery-side connector to be connected along with a battery-housing indication which indicates a shape and a housing orientation of the battery to be housed in the housing part. This provides a guiding indication easy to view and understand, allowing a smooth, correct connection between the battery and the apparatus body through the connectors.

14 Claims, 6 Drawing Sheets

ELECTRONIC APPARATUS

BACKGROUND OF THE INVENTION

1. Field of the Invention

The present invention relates to an electronic apparatus using a battery as a power source connected thereto through a connecting cable and more particularly to an electronic apparatus provided with a guiding indication which informs a user of a manner of mounting the battery in the electronic apparatus.

2. Description of Related Art

In conventional compact electronic apparatuses, a dry battery, an AC adaptor, a charging battery, and the like are commonly used as a driving source. The apparatuses include an electronic apparatus using only a single type of them as the driving source and another apparatus selectively using one of several types as the driving source according to a using condition.

In one of the compact electronic apparatuses, for example, a label producing machine which produces a label by printing thereon inputted contents such as characters, symbols, etc. is internally provided with a charging battery. The machine is placed on a charger stand during non-use to charge the charging battery, and is removed from the charging stand before use and uses electricity stored in the charging battery.

Some label producing machines are not provided with a charging battery in a body of each machine at the time of purchase. Thus, a user has to insert the charging battery in a battery compartment while paying attention to orientation or positioning of the charging battery and then connect a connector provided at an end of a cable extending from the charging battery to a connector provided inside the battery compartment. Even after mounting the charging battery once, the user has to replace it with new one if the mounted charging battery is weak or dead, though the number of replacement is low. This connection of the connectors is usually conducted by engagement of the connectors with each other. However, the connectors often have structures which cannot be connected unless connecting conditions such as positional relation between the connectors, an orientation of each connector to be connected, and others are properly satisfied. Accordingly, in many cases, a guiding indication which indicates how to properly connect the connectors is additionally applied to near the connector provided in the battery compartment. For instance, a label producing machine (Product name: PT-18R manufactured by Brother Kogyo Kabushiki Kaisha) is provided with such guiding indication on a surface of a stepped part formed in the battery compartment, the surface being higher and in parallel with a bottom surface of the battery compartment. The guiding indication is integrally formed with a member or material forming the battery compartment at the time of molding.

Another label producing machine (Product name: PT-55 manufactured by Brother Kogyo Kabushiki Kaisha) is structured to work on four dry batteries. A guiding indication which indicates an orientation of the dry batteries to be inserted is provided near an opening of the battery compartment. This guiding indication is also formed integrally with a member or material forming the opening at the time of molding.

A washable electronic apparatus such as an electric razor or the like is arranged so that a power supply part such as a battery is removably connected to a body through a power supply plug, thereby supplying electric power to the body. If the power supply plug is connected to the body while a detachable part of the power supply plug is wetted, electric current is caused to flow through between electrode terminals in the detachable part, thus corroding the electrode terminals. To prevent such electric corrosion, Japanese patent application laid-open No. 2001-244013 (hereinafter, Document 1) discloses that a partition wall is provided for preventing electrical conduction between electrode terminals which may be caused by water. FIG. 5 of Document 1 shows a power supply plug having right and left electrode terminals and a cover which covers them. On a surface of the cover, marks representing respective polarities of the electrode terminals are applied. FIGS. 1 and 2 of Document 1 show an electrical appliance provided at a bottom with a detachable part to which the power supply plug is connected. The electrical appliance and the power supply plug are constructed to be connectable only when respective detachable parts are aligned in face to face at a predetermined angle and be unconnectable if they are turned about an axis from the aligned position by e.g. 180°.

SUMMARY OF THE INVENTION

In the former label producing machine (PT-18R), however, the guiding indication is provided inside the battery compartment which receives the charging battery, so that it is inconspicuous to a user. Even if the user can recognize the existence of the guiding indication, it is illegible because it is apt to be hidden behind the machine body. When the charging battery is housed in the battery compartment, the indication would become further illegible. During works to connect the connectors, furthermore, the guiding indication would be hidden behind the user's hand, the cable extending from the charging battery held by his hand, and the connector provided at the end of the cable. This makes it difficult for the user to correctly connect the connectors.

In the electrical appliance shown in Document 1, the power supply plug is applied with the indications representing the polarity of each terminal, whereas the body of the electrical appliance is not applied with any indication. Consequently, the user may not correctly connect the plug to the electrical appliance with correct polarities by one connecting work.

The present invention has been made in view of the above circumstances and has an object to overcome the above problems and to provide an electronic apparatus provided with a guiding indication which indicates a connecting orientation of a battery-side connector in a conspicuous position and in a easy-to-understand form, so that a battery and an apparatus body can be connected smoothly through connectors without fails.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided an electronic apparatus comprising: an apparatus body; a battery which supplies power to the apparatus; a housing part formed in the body in which the battery is housed; an opening through which the battery is inserted in the housing part; a connecting cable; a first connector connected to the battery through the connecting cable; a second connector which is provided in the body and electrically connects the battery to the body when the first connector is connected to the second connector, the first connector being detachably connected to the second connector; and a connector-connection indication which is provided on an outer surface of the body near the opening and the second connector and is arranged to indicate a connecting orientation of the first connector.

According to the above electronic apparatus, while the battery is housed in the housing part of the body, the battery-side connector connected to the battery through the connecting cable and the body-side connector for electrically connecting the battery housed in the housing part to the body are detachably connected. The connector-connection indication which indicates a connecting orientation of the battery-side connector is provided on a surface near the opening of the housing part and also near the body-side connector. This indication is easy to view and will not be hidden behind the body of the electronic apparatus. Further, the indication is legible even after the battery is inserted in the housing part. During connection of the connectors, the indication will not be hidden behind by the user's hand, the cable extending from the battery held by his hand, and the connector provided at the end of the cable. Accordingly, it is possible to prevent failures of connection between the connectors.

According to another aspect of the invention, there is provided an electronic apparatus comprising: an apparatus body; a battery which supplies power to the apparatus; a housing part formed in the body in which the battery is housed; an opening through which the battery is inserted in the housing part; a connecting cable; a first connector connected to the battery through the connecting cable; a second connector which is provided in the body and electrically connects the battery to the body when the first connector is connected to the second connector, the first connector being detachably connected to the second connector; a connector-connection indication which is provided on an outer surface of the body near the opening and the second connector and is arranged to indicate a connecting orientation of the first connector; and a battery-housing indication which is provided on the surface near the opening and adjacent to the connector-connection indication and which represents a shape and a housing orientation of the battery to be housed in the housing part.

According to the above electronic apparatus, the connector-connection indication is easy to view and will not be hidden behind the body of the electronic apparatus. Further, the indication is legible even after the battery is inserted in the housing part. During connection of the connectors, the indication will not be hidden behind by the user's hand, the cable extending from the battery held by his hand, and the connector provided at the end of the cable. Accordingly, it is possible to prevent failures of connection between the connectors. Further, when the opening of the housing part is closed by the cover, covering over the battery housed in the housing part, the user can recognize that the battery has been housed inside, which is convenient. It is therefore possible to give the user to clearly understand the type of connector as compared with the case where only the connector-connection indication is provided. The apparatus also can have a simple appearance. Indication of the housing orientation of the battery to be housed allows the user to house the battery in the housing part correctly.

According to another aspect of the invention, there is provided an electronic apparatus comprising: an apparatus body; a battery which supplies power to the apparatus; a housing part formed in the body in which the battery is housed; an opening through which the battery is inserted in the housing part; a connecting cable; a first connector connected to the battery through the connecting cable; a second connector which is provided in the body and electrically connects the battery to the body when the first connector is connected to the second connector, the first connector being detachably connected to the second connector; a cover which is removably attached to the body to open and close the opening, thereby covering the battery housed in the housing part; a connector-connection indication which is provided on an outer surface of the body near the opening and the second connector and is arranged to indicate a connecting orientation of the first connector by indicating electric polarities of a plurality of terminals constituting the first connector in different colors, showing a difference in electric polarities by color-coding; and a battery-housing indication which is provided on the surface near the opening and adjacent to the connector-connection indication and which represents a shape and a housing orientation of the battery to be housed in the housing part, and a mark representing the connecting cable to be connected to the first connector; wherein the plurality of cords or a surface of the first connector corresponding to the plurality of cords are color-coded in similar colors to colors of the polarity marks based on the difference in electric polarity, and at least one of the connector-connection indication and the battery-housing indication is a label affixed on the surface near the opening and the second connector.

According to the above electronic apparatus, the connector-connection indication is easy to view and will not be hidden behind the body of the electronic apparatus. Further, the indication is legible even after the battery is inserted in the housing part. During connection of the connectors, the indication will not be hidden behind by the user's hand, the cable extending from the battery held by his hand, and the connector provided at the end of the cable. Accordingly, it is possible to prevent failures of connection between the connectors. Further, while the opening of the housing part is covered by the cover, covering over the battery housed in the housing part, the user can recognize that the battery has been housed inside, which is convenient. It is therefore possible to give the user to clearly understand the type of connector as compared with the case where only the connector-connection indication is provided. Thus, the apparatus can have a simple appearance. Indication of the housing orientation of the battery to be housed allows the user to house the battery in the housing part correctly.

Further, since the battery which is less often replaced normally is covered by the cover, it is inconspicuous to the user. In the case where some components except the battery need be replaced, the cover is effective in making the user divert attention from the battery. The apparatus can be simple in design.

The battery itself and the connecting cable associated with the battery are indicated. Thus, the user can recognize the orientation of the battery and more surely house the battery in the housing part.

The indicated color allows the user to recognize the polarity of each terminal and correspondingly connect the battery-side connector to the body-side connector in a correct manner.

Even when the user does not recognize what color indicates which polarity of each terminal, the color of the connector-connection indication singly allows the user to correctly connect the battery-side connector to the body-side connector.

The character or symbol forming the indication allows the user who reads it to recognize a difference in polarity so that the user can more correctly connect the battery-side connector to the body-side connector as compared with the case where he gives attention to only the color. Particularly, such structure can have effect on a person who has defective color vision.

Furthermore, at least one of the connector-connection indication and the battery-housing indication is provided as an adhesive label, which can achieve a reduction in cost.

According to another aspect of the invention, there is provided an electronic apparatus comprising: an apparatus body; a battery which supplies power to the apparatus; a housing part formed in the body in which the battery is housed; an opening through which the battery is inserted in the housing part; a connecting cable; a first connector connected to the battery through the connecting cable; a second connector which is provided in the body and electrically connects the battery to the body when the first connector is connected to the second connector, the first connector being detachably connected to the second connector; a cover which is removably attached to the body to open and close the opening, thereby covering the battery housed in the housing part; a connector-connection indication which is provided on an outer surface of the body near the opening and the second connector and is arranged to indicate a connecting orientation of the first connector by indicating electric polarities of a plurality of terminals constituting the first connector in different colors, showing a difference in electric polarities by color-coding; and a battery-housing indication which is provided on the surface near the opening and adjacent to the connector-connection indication and which represents a shape and a housing orientation of the battery to be housed in the housing part; wherein the plurality of cords or a surface of the first connector corresponding to the plurality of cords are color-coded in similar colors to colors of the polarity marks based on the difference in electric polarity, and at least one of the connector-connection indication and the battery-housing indication is a label affixed on the surface near the opening and the second connector.

According to the above electronic apparatus, the connector-connection indication is easy to view and will not be hidden behind the body of the electronic apparatus. Further, the indication is legible even after the battery is inserted in the housing part. During connection of the connectors, the indication will not be hidden behind by the user's hand, the cable extending from the battery held by his hand, and the connector provided at the end of the cable. Accordingly, it is possible to prevent failures of connection between the connectors. Further, while the opening of the housing part is covered by the cover, covering over the battery housed in the housing part, the user can recognize that the battery has been housed inside, which is convenient. It is therefore possible to give the user to clearly understand the type of connector as compared with the case where only the connector-connection indication is provided. Thus, the apparatus can have a simple appearance. Indication of the housing orientation of the battery to be housed allows the user to house the battery in the housing part correctly.

Further, since the battery which is less often replaced normally is covered by the cover, it is inconspicuous to the user. In the case where some components except the battery need be replaced, the cover is effective in making the user divert attention from the battery. The apparatus can be simple in design.

The indicated color allows the user to recognize the polarity of each terminal and correspondingly connect the battery-side connector to the body-side connector in a correct manner.

Even when the user does not recognize what color indicates which polarity of each terminal, the color of the connector-connection indication singly allows the user to correctly connect the battery-side connector to the body-side connector.

The character or symbol forming the indication allows the user who reads it to recognize a difference in polarity so that the user can more correctly connect the battery-side connector to the body-side connector as compared with the case where he gives attention to only the color. Particularly, such structure can have effect on a person who has defective color vision.

Furthermore, at least one of the connector-connection indication and the battery-housing indication is provided as an adhesive label, which can achieve a reduction in cost.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of a tape printer as an electronic apparatus embodying the present invention will now be given referring to the accompanying drawings.

Figure 1:
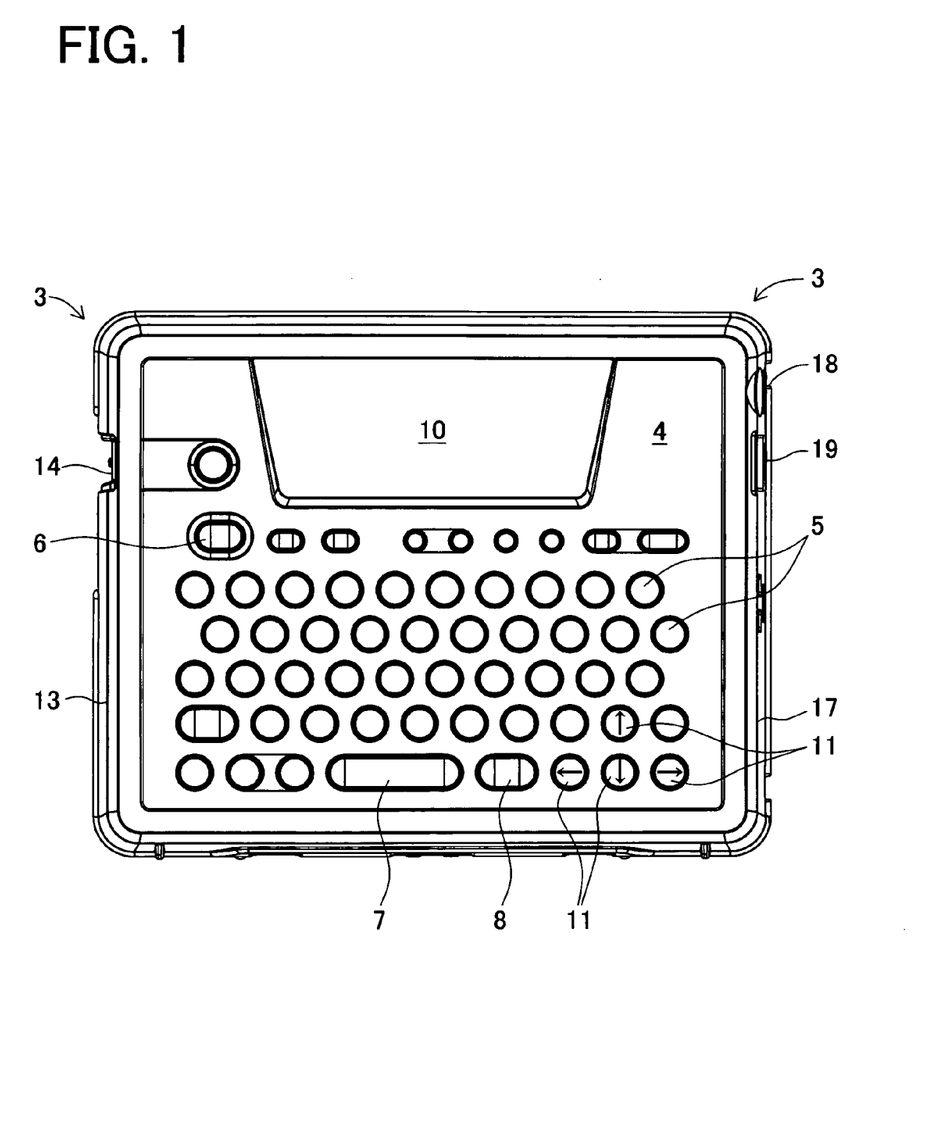
FIG. 1 is a plan view of a tape printer in an embodiment of an electronic apparatus according to the present invention.
Figure 4:
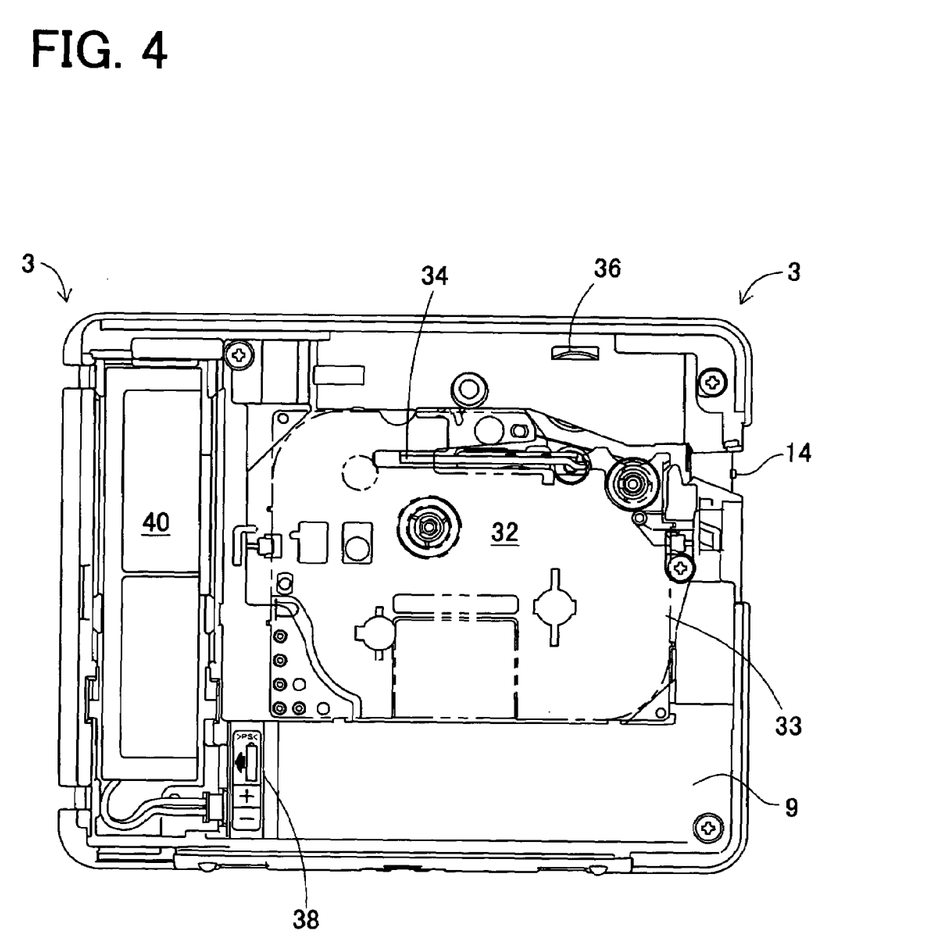
FIG. 4 is another bottom view of the tape printer with a battery cover being removed, showing the inside of a battery compartment.
Figure 5:
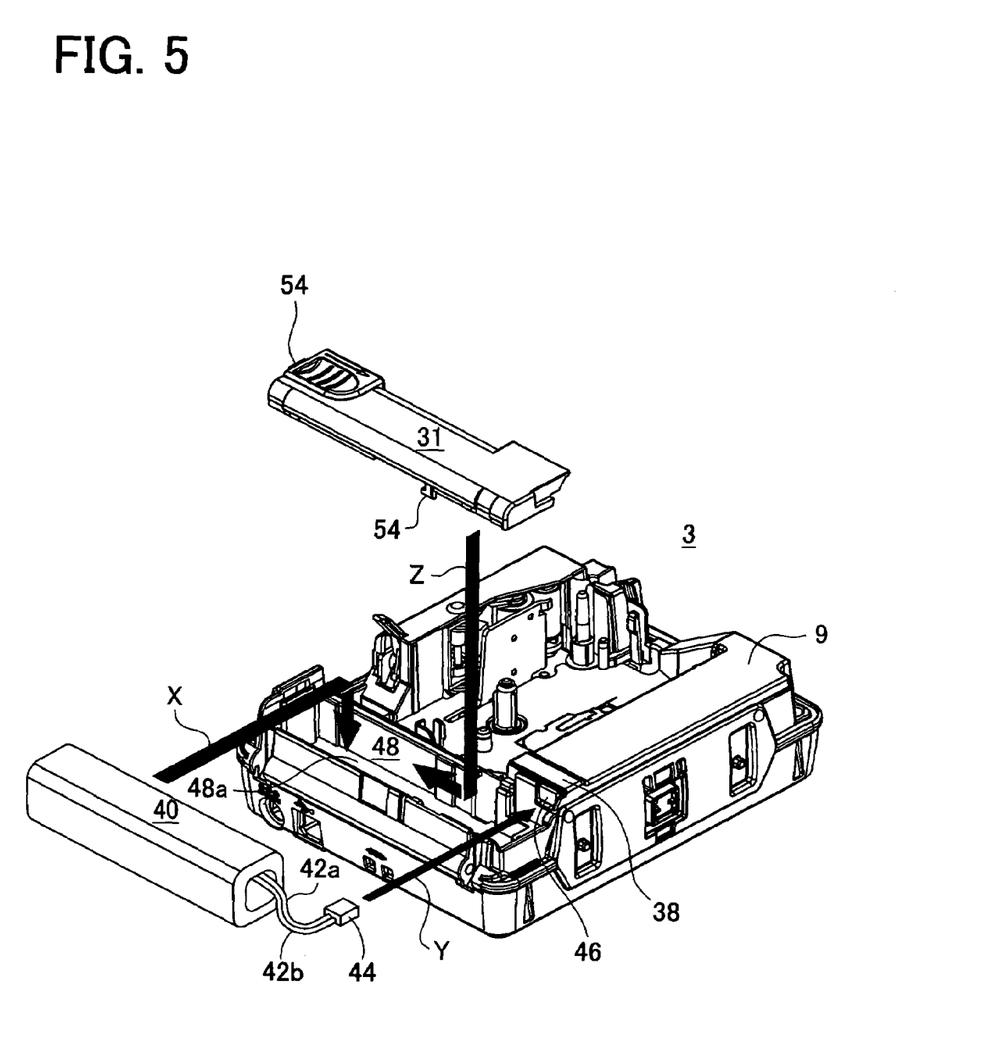
FIG. 5 is a perspective view showing a manner of mounting a charging battery in the tape printer.

A tape printer 3 in the present embodiment is principally constructed of a body 9 containing various components or elements and a charging battery 40 detachably connected to the body 9 (see FIG. 5). A schematic structure of the tape printer 3 in the present embodiment will be described below, referring to FIGS. 1 through 5. FIG. 1 is a plan view of the tape printer 3.

As shown in FIG. 1, arranged on a top surface 4 of the tape printer 3 having a substantially box-like shape are character input keys 5 for inputting characters to form a text as document data, a print key 6 for instructing printing of the text, a space key 7 for converting katakana or hiragana to kanji (which are different character types used in Japan) and inputting a space, a return key 8 for instructing linefeed, execution and selection of various kinds of processing, and a cursor key 11 for moving a cursor up and down, right and left on a liquid crystal display 10.

A left side wall 13 of the tape printer 3 is formed with a tape discharge opening 14 through which a printed tape is discharged. A right side wall 17 of the tape printer 3 is formed with an adaptor insertion opening 18 in which a power supply adaptor is inserted, a connector 19 to which a USB cable is connected for connection to a personal computer not shown, and others. The tape printer 3 constructed as above is horizontally placed on a table or the like so that the top surface 4 faces upward and operates either on AC power through the power supply adaptor inserted in the adaptor insertion opening 18 or a built-in secondary battery without insertion of the power supply adaptor. Thus, the tape printing can be conducted.

Figure 2:
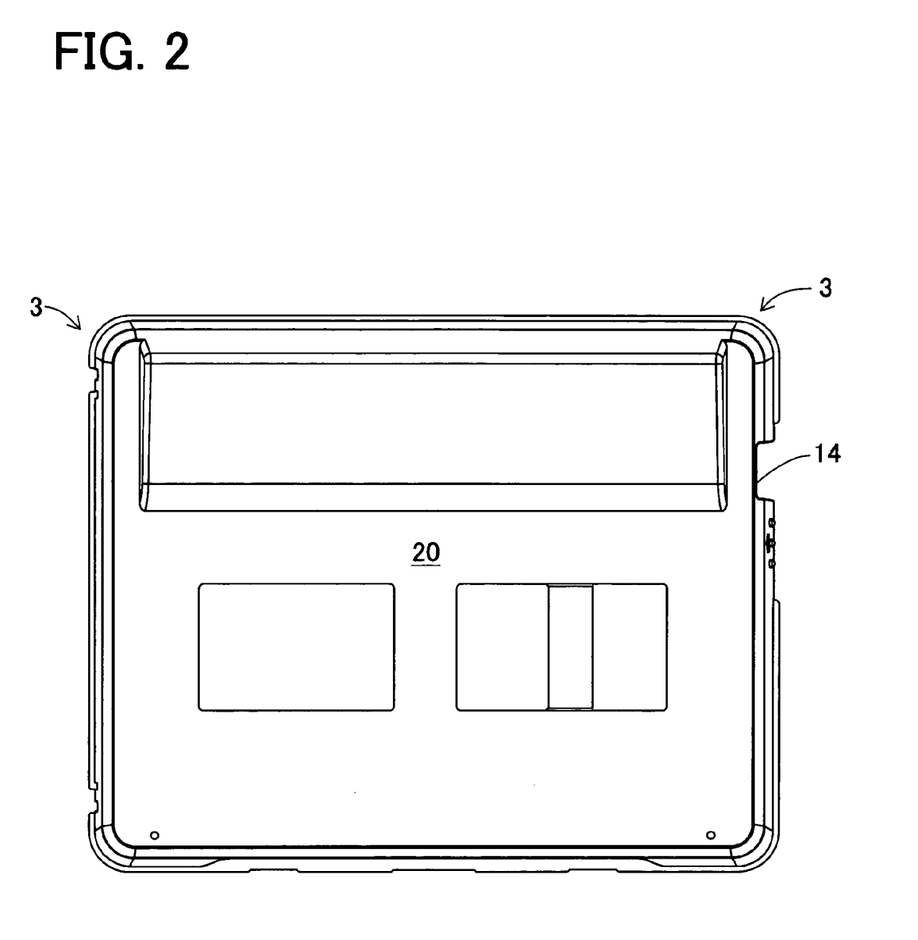
FIG. 2 is a bottom view of the tape printer of FIG. 1.

FIG. 2 is a bottom view of the tape printer 3 in the present embodiment. As shown in FIG. 2, the bottom of the tape printer 3 having a substantially box-like shape is entirely covered by an opening/closing lid 20. This lid 20 is attached to the body 9 of the printer 3 with hinges (not shown) provided at an upper left and lower left corners in the figure, respectively. The lid 20 is turned about the hinges in a direction perpendicular to a drawing paper into an opened state.

Figure 3:
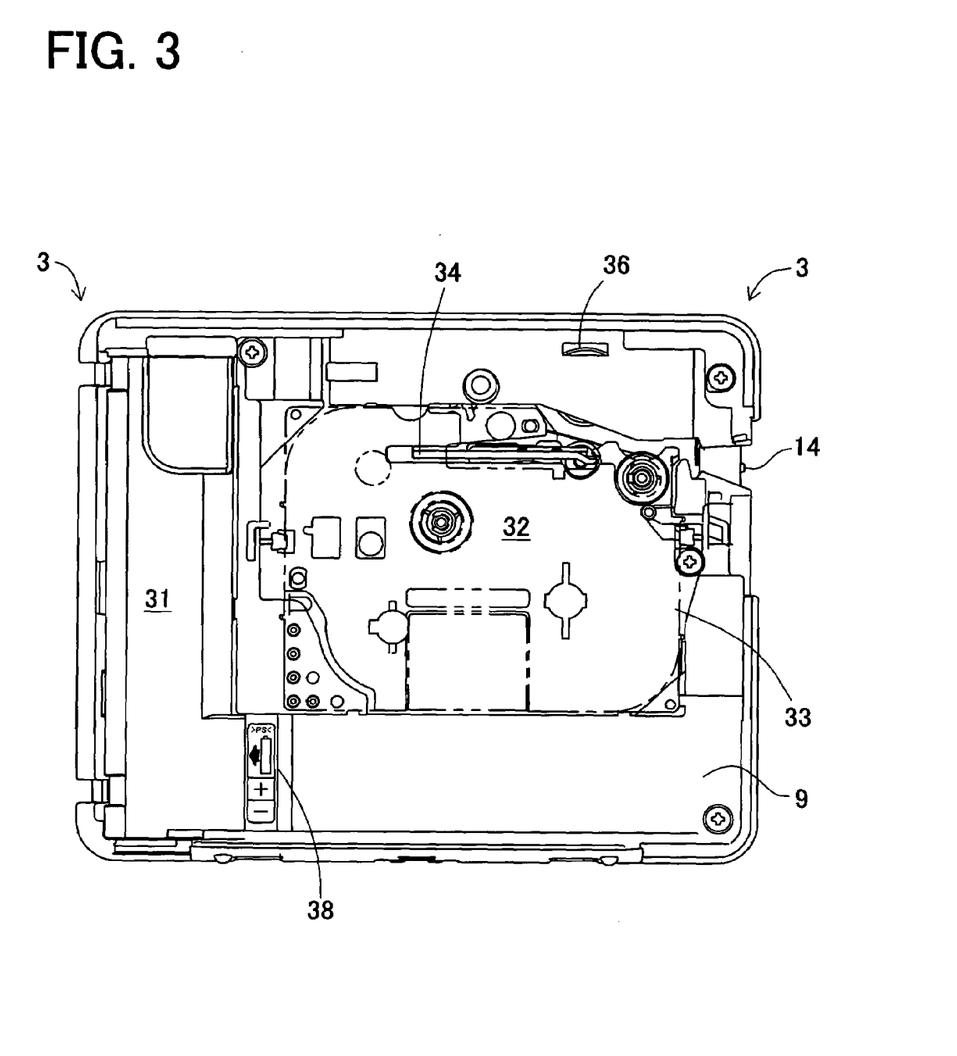
FIG. 3 is another bottom view of the tape printer with an opening/closing lid being opened, showing the inside of the tape printer.

FIG. 3 is a bottom view of the tape printer 3 with the lid 20 opened, showing the inside of the printer 3. The lid 20 in an opened state is omitted from the figure. At an inside right of the printer 3 (namely, an inside left in FIGS. 3 to 5), the body 9 is formed with a battery compartment 48 (a housing part of the invention), which receives a charging battery 40 as shown in FIG. 4. A battery cover 31 is provided to close an opening 48a of the battery compartment 48, thus covering the charging battery 40. This battery cover 31 is removably attached to the body 9 (the details will be mentioned later). A cassette compartment 32 like a cavity is centrally formed in the tape printer 3. A print head 34 which is heated to form images on a tape used as a print medium is placed in the cassette compartment 32 at an inside back (an upper part in the figures). A platen roller 36 for feeding the tape is also placed at the back (above in the figures) of the cassette compartment 32 and facing the print head 34 through the tape. A phantom line 33 represents the contour of a cassette housed in the cassette compartment 32. A label 38 related to a charging battery is affixed on an outer surface of the body 9 near a lower part of the opening 48a. This label 38 corresponding to a connector-connection indication and a battery-housing indication of the present invention. The details of the label 38 will be mentioned later. As shown in FIG. 3, the label 38 can be seen clearly by a user even when the battery cover 31 is attached.

FIG. 4 is another bottom view of the printer 3 with the battery cover 31 removed, showing the battery compartment 48 in which the charging battery 40 is housed. Extended from the charging battery 40 are two cords 42a and 42b serving as a connecting cable, which are connected to a battery-side connector 44 (a first connector of the invention). This connector 44 is detachably connected to a body-side connector 46 (a second connector of the invention) provided in a side wall forming the battery compartment 48 in the body 9. Accordingly, the charging battery 40 itself is replaceable. The cord 42a has positive (+) polarity and includes a surface made of an insulative flexible resin material colored in red. The cord 42b has negative (−) polarity and includes a surface made of the same material as that of the cord 42, but colored in black. The label 38 is affixed to the outer surface of the body 9 near the opening 48a, in particular, a closest portion to the body-side connector 46.

FIG. 5 is a perspective view showing a manner of mounting the charging battery 40 in the tape printer 3. In FIG. 5, a right front side of the printer 3 corresponds to the user side and a left back of the printer 3 corresponds to the rear side. At the time of purchase, the charging battery 40 is not housed in the tape printer 3. Since the tape printer 3 does not operate unless the charging battery 40 is housed therein, the charging battery 40 has to be housed before use of the tape printer 3 in the following manner. Firstly, the charging battery 40 is inserted in the battery compartment 48 as indicated by a broad arrow X in an orientation such that the cords 42a and 42b are on the user side of the tape printer 3.

Figure 6:
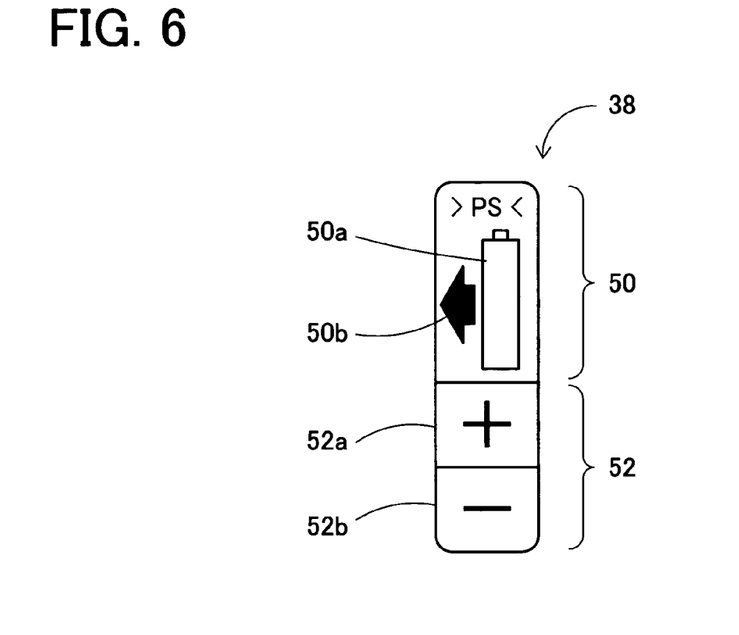
FIG. 6 is a plan view of a label used in the tape printer.

Here, the above battery housing manner is suspended to explain the label 38 first. FIG. 6 is a plan view of the label 38, showing a configuration thereof. Specifically, the label 38 is configured of a battery-housing indication 50 representing that the battery has been housed in the battery compartment 48 and a connector-connection indication 52 representing an orientation, or positioning, of the connector. The battery-housing indication 50 includes a battery mark 50a taking the shape of a dry battery and an arrow mark 50b, which show that a battery is placed in a position indicated by the arrow mark 50b. This makes it possible for a user to easily recognize the existence of the battery even when the battery cover 31 is put on the battery compartment 48. The connector-connection indication 52 includes a polarity mark 52a consisting of a white mark "+" on a red background and a polarity mark 52b consisting of a white mark "−" on a black background, which show the user the orientation of the battery-side connector 44 to be connected to the body-side connector 46. These marks 52a and 52b represent a difference in electric polarity. The indication 52 indicates that the connector 44 is correctly fit in the connector 46 when the cord 42a having positive polarity, coated with the red synthetic resin, and the cord 42b having negative polarity, coated with the black synthetic resin, are positioned in correspondence with the red polarity mark 52a and the black polarity mark 52b, respectively. The label 38 is affixed so that the battery-housing indication 50 is on the rear side and the connector-connection indication 52 is on the user side as shown in FIG. 4. Thus, the connector-connection indication 52 is positioned close to the body-side connector 46.

Returning to FIG. 5, the explanation is continued. After the charging battery 40 is inserted in the battery compartment 48, the battery-side connector 44 is connected to the body-side connector 46 as indicated by a narrow arrow Y in accordance with the marks 52a and 52b of the connector-connection indication 52. Then, the battery cover 31 is put on the opening 48a of the battery compartment 48 and in a position slightly closer to the user side, as shown by a broad arrow Z. The cover 31 is moved toward the rear side until it comes into contact with an inside back wall of the battery compartment 48. Accordingly, projections 54 formed one at each of a back end, and right and left sides of the cover 31 are brought in engagement with catching parts (not shown) formed in the opening 48a of the battery compartment 48. In this manner, the cover 31 is removably attached to the body 9.

Figure 7:
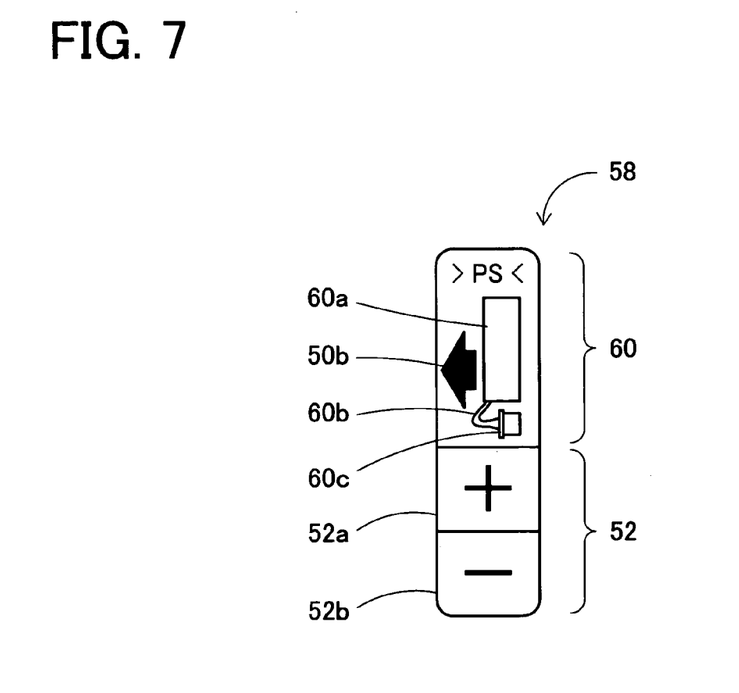
FIG. 7 is a plan view of another label used in the tape printer.

FIG. 7 is a plan view of a charging battery label in another embodiment. A label 58 has an identical configuration to the label 38 mentioned above except for a battery-housing indication. The identical parts to those of the label 38 are indicated by the same numerals and their explanation is omitted. A mark representing a battery-housing indication 60, which is given in the form more resembling to an actual charging battery, includes a connecting cable mark 60b and a battery-side connector mark 60c in addition to a battery body mark 60a. Thus, it is possible to show the shape of the charging battery 40 and the housing orientation of the charging battery 40 to be housed in the battery compartment 48.

The present invention may be embodied in other specific forms without departing from the spirit or essential characteristics thereof.

For instance, the battery-housing indication and the connector-connection indication need not be configured as the single label 38 or 58. The indications may be provided as separate labels.

In the above embodiment, the battery-housing indication and the connector-connection indication are both provided in the form of an adhesive label. Alternatively, these indications may be engraved on an inner surface of the electronic apparatus when it is molded by use of a metallic mold. In this case, the engraving position corresponds to the affixing position of the label mentioned above. In another alternative, one of the battery-housing indication and the connector-connection indication may be formed as an engraved mark by the metallic mold, and the other may be formed as an adhesive label.

The connector-connection indication is preferably positioned close to the body-side connector in FIG. 4 as indicated in the above embodiment. However, it may be placed slightly out of a desired position. The battery-housing indication may especially be provided at a different position from the above described position. Although the battery-housing indication 50 is placed on the rear side of the printer 3 so that it is vertically adjacent to the connector-connection indication 52 in FIGS. 6 and 7, for example, it may be at the left of the connector-connection indication 52.

Further, the polarities may be represented as characters; "Plus" and "Minus" instead of using symbols; "+" and "−".

The connecting cable of the charging battery may be modified. For example, the cord 42a remains colored in red and the cord 42b may be uncolored, remaining white. Instead of coloring the cords 42a and 42b, the battery-side connector 44 may be colored in red at a closer part to the cord 42a and in black at a closer part to the cord 42b.

Furthermore, the battery-housing indication is not limited to the mark taking the form of a battery and may be constituted of characters representing a battery or a charging battery, or in combination of such characters and the mark.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An electronic apparatus comprising:
   an apparatus body;
   a battery which supplies power to the apparatus;
   a housing part formed in the body in which the battery is housed;
   an opening through which the battery is inserted in the housing part;
   a connecting cable;
   a first connector connected to the battery through the connecting cable;
   a second connector which is provided in the body and electrically connects the battery to the body when the first connector is connected to the second connector, the first connector being detachably connected to the second connector; and
   a connector-connection indication which is provided on an outer surface of the body near the opening and the second connector and is arranged to indicate a connecting orientation of the first connector.

2. The electronic apparatus according to claim 1 further comprising a cover which is removably attached to the body to open and close the opening, thereby covering the battery housed in the housing part.

3. The electronic apparatus according to claim 1, wherein the connector-connection indication includes polarity marks which indicate electric polarities of a plurality of terminals constituting the first connector in different colors, showing a difference in electric polarity by color coding.

4. The electronic apparatus according to claim 3, wherein the connecting cable includes a plurality of cords, and
   the plurality of cords or a surface of the first connector corresponding to the plurality of cords are color-coded in similar colors to colors of the polarity marks based on the difference in electric polarity.

5. The electronic apparatus according to claim 3, wherein the polarity marks are represented as a character or symbol.

6. An electronic apparatus comprising:
   an apparatus body;
   a battery which supplies power to the apparatus;
   a housing part formed in the body in which the battery is housed;
   an opening through which the battery is inserted in the housing part;
   a connecting cable;
   a first connector connected to the battery through the connecting cable;
   a second connector which is provided in the body and electrically connects the battery to the body when the first connector is connected to the second connector, the first connector being detachably connected to the second connector;
   a connector-connection indication which is provided on an outer surface of the body near the opening and the second connector and is arranged to indicate a connecting orientation of the first connector; and
   a battery-housing indication which is provided on the surface near the opening and adjacent to the connector-connection indication and which represents a shape and a housing orientation of the battery to be housed in the housing part.

7. The electronic apparatus according to claim 6 further comprising a cover which is removably attached to the body to open and close the opening, thereby covering the battery housed in the housing part.

8. The electronic apparatus according to claim 6, wherein the connector-connection indication includes polarity marks which indicate electric polarities of a plurality of terminals constituting the first connector in different colors, showing a difference in electric polarity by color coding.

9. The electronic apparatus according to claim 8,
   the connecting cable includes a plurality of cords, and
   the plurality of cords or a surface of the first connector corresponding to the plurality of cords are color-coded in similar colors to colors of the polarity marks based on the difference in electric polarity.

10. The electronic apparatus according to claim 8, wherein the polarity marks are represented as a character or symbol.

11. The electronic apparatus according to claim 6, wherein at least one of the connector-connection indication and the battery-housing indication is integrally molded with a member forming the opening.

12. The electronic apparatus according to claim 6, wherein
at least one of the connector-connection indication and the battery-housing indication is a label affixed on the surface near the opening and the second connector.

13. An electronic apparatus comprising:
an apparatus body;
a battery which supplies power to the apparatus;
a housing part formed in the body in which the battery is housed;
an opening through which the battery is inserted in the housing part;
a connecting cable;
a first connector connected to the battery through the connecting cable;
a second connector which is provided in the body and electrically connects the battery to the body when the first connector is connected to the second connector,
the first connector being detachably connected to the second connector;
a cover which is removably attached to the body to open and close the opening, thereby covering the battery housed in the housing part;
a connector-connection indication which is provided on an outer surface of the body near the opening and the second connector and is arranged to indicate a connecting orientation of the first connector by indicating electric polarities of a plurality of terminals constituting the first connector in different colors, showing a difference in electric polarities by color-coding; and
a battery-housing indication which is provided on the surface near the opening and adjacent to the connector-connection indication and which represents a shape and a housing orientation of the battery to be housed in the housing part, and a mark representing the connecting cable to be connected to the first connector;
wherein the plurality of cords or a surface of the first connector corresponding to the plurality of cords are color-coded in similar colors to colors of the polarity marks based on the difference in electric polarity, and
at least one of the connector-connection indication and the battery-housing indication is a label affixed on the surface near the opening and the second connector.

14. An electronic apparatus comprising:
an apparatus body;
a battery which supplies power to the apparatus;
a housing part formed in the body in which the battery is housed;
an opening through which the battery is inserted in the housing part;
a connecting cable;
a first connector connected to the battery through the connecting cable;
a second connector which is provided in the body and electrically connects the battery to the body when the first connector is connected to the second connector,
the first connector being detachably connected to the second connector;
a cover which is removably attached to the body to open and close the opening, thereby covering the battery housed in the housing part;
a connector-connection indication which is provided on an outer surface of the body near the opening and the second connector and is arranged to indicate a connecting orientation of the first connector by indicating electric polarities of a plurality of terminals constituting the first connector in different colors, showing a difference in electric polarities by color-coding; and
a battery-housing indication which is provided on the surface near the opening and adjacent to the connector-connection indication and which represents a shape and a housing orientation of the battery to be housed in the housing part;
wherein the plurality of cords or a surface of the first connector corresponding to the plurality of cords are color-coded in similar colors to colors of the polarity marks based on the difference in electric polarity, and
at least one of the connector-connection indication and the battery-housing indication is a label affixed on the surface near the opening and the second connector.

* * * * *